(12) United States Patent
Helmut et al.

(10) Patent No.: US 8,030,629 B2
(45) Date of Patent: Oct. 4, 2011

(54) ADAPTIVE X-RAY OPTICS

(75) Inventors: Zacharias Helmut, Havixbeck (DE); Martin Silles, Osnabrueck (DE)

(73) Assignee: Westfälische Wilhelms-Universität Münster, Münster (DE)

( * ) Notice: Subject to any disclaimer, the term of this patent is extended or adjusted under 35 U.S.C. 154(b) by 207 days.

(21) Appl. No.: 12/520,551

(22) PCT Filed: Dec. 6, 2007

(86) PCT No.: PCT/EP2007/010595
§ 371 (c)(1),
(2), (4) Date: Jun. 22, 2009

(87) PCT Pub. No.: WO2008/077458
PCT Pub. Date: Jul. 3, 2008

(65) Prior Publication Data
US 2010/0012863 A1    Jan. 21, 2010

(30) Foreign Application Priority Data
Dec. 22, 2006   (GB) .................................. 0625871.9

(51) Int. Cl.
G21K 1/06    (2006.01)
H01L 31/0232    (2006.01)
G01N 23/20    (2006.01)

(52) U.S. Cl. .................... 250/505.1; 250/338.4; 378/70; 378/20; 438/29; 438/69

(58) Field of Classification Search ............... 250/505.1, 250/338.4; 438/29, 69; 378/70, 20
See application file for complete search history.

(56) References Cited

U.S. PATENT DOCUMENTS

| 5,044,736 | A | 9/1991 | Jaskie et al. |
| 5,721,429 | A * | 2/1998 | Radford et al. ............. 250/338.4 |
| 5,960,024 | A | 9/1999 | Li et al. |
| 7,012,271 | B2 | 3/2006 | Gorinevsky et al. |
| 7,336,761 | B2 * | 2/2008 | Udpa et al. ........................ 378/9 |
| 2002/0153362 | A1 | 10/2002 | Sandstrom et al. |
| 2005/0227374 | A1 * | 10/2005 | Cunningham ................ 436/518 |
| 2006/0239403 | A1 | 10/2006 | Udpa et al. |

FOREIGN PATENT DOCUMENTS

| DE | 44 25 594 A1 | 1/1996 |
| EP | 1 376 192 A2 | 1/2004 |

(Continued)

OTHER PUBLICATIONS

UK Patent Office Search Report dated Apr. 12, 2007, Application No. GB0625871.9 (4 pgs).

(Continued)

*Primary Examiner* — Nikita Wells
(74) *Attorney, Agent, or Firm* — Sylke Law Offices, LLC; C. Thomas Sylke (57) ABSTRACT

The invention relates to an adaptive optical device for the reflection of impinging radiation, the adaptive optical device comprising at least one actuator and at least one partially reflective volume. The at least one partially reflective volume has a first surface that is oriented to the impinging radiation. The at least one partially reflective volume is at least partially deformable by said at least one actuator such that the impinging radiation is reflected at the at least one partially reflective volume substantially in accordance with Bragg's law. Further, the invention relates to a method and apparatus for controlling the shape of an adaptive optical device.

20 Claims, 5 Drawing Sheets

FOREIGN PATENT DOCUMENTS

| | | |
|---|---|---|
| FR | 2 881 264 A1 | 7/2006 |
| WO | WO 00062306 A3 | 10/2000 |

OTHER PUBLICATIONS

UK Patent Office Search Report dated Jan. 26, 2009, Application No. GB0625871.9 (5 pgs).

International Search Report, International Application No. PCT/EP2007/010595 (6 pgs).

Written Opinion of the International Searching Authority, International Application No. PCT/EP2007/010595 (7 pgs).

Touryanski, A. G. et al.; "Semitransparent monochromators for X-ray imaging based on highly oriented pyrolytic graphite (HOPG)," Proceedings of the SPIE—The International Society for Optical Engineering SPIE-Int. Soc. Opt. Eng USA, vol. 4508; 2001; pp. 58-64; Reference No. XP-002478465 (7 pgs).

Takenaka, H. et al.; "Heat-Resistance Of Mo/Si Multilayer Euv Mirrors With Interleaved Carbon Barrier-Layers," OSA Trends in Optics And Photonics; Washington, DC, US; vol. 4; May 1, 1996, pp. 169-172, Reference No. XP-008007480 ISSN: 1094-5695 (4 pgs).

Berman, L. et al.; "Adaptive Crystal Optics for High Power Synchrotron Sources," Nuclear Instruments and Methods in Physics Research Section A, vol. A302, No. 3; May 1, 1991; Amsterdam, Netherlands; p. 558-562 , Reference No. XP-000231770 (5 pgs).

Schulte-Schrepping, H. et al.; "Novel Adaptive Directly Water-Cooled Monochromator Crystal for High Heat Load Wiggler Beamlines," Review of scientific instruments ISSN 0034-6748; vol. 66, No. 2; Feb. 1995; pp. 2217-2219; Reference No. XP-002478466 (3 pgs).

Hardy, J.; "Active Optics: A New Technology for the Control of Light," Proceedings the IEEE; Jun. 1978; vol. 66, No. 6; New York, U.S.; ISSN 0018-9219; pp. 651-697; Reference No. XP-009016126 (47 pgs).

European Patent Office Search Report dated Dec. 13, 2010, Application No. 07 856 401.0 (5 pgs).

Thompson, Al; Vaughan, Doug; Underwood, James H.; "X-ray data booklet"; Center for X-ray Optics and Advanced Light Source of the Lawrence Berkeley National Laboratory, second edition, Jan. 2001 (9 pgs).

* cited by examiner

ADAPTIVE X-RAY OPTICS

CROSS-REFERENCE TO RELATED APPLICATIONS

This application claims the benefit of priority under 35 U.S.C. §119(e) and any other United States or other law of the following: UK Application No. GB 0625871.9, filed 22 Dec. 2006, UK Publication No. GB 2 444 962 A, bearing the Abstract Title: "Deformable reflecting device" the entire disclosure of which is incorporated herein by reference in its entirety for all purposes.

FIELD OF THE INVENTION

The present invention relates to an adaptive optical device for reflecting impinging radiation.

BACKGROUND OF THE INVENTION

The term "adaptive optical device" used in this description is intended to encompass bother so-called "active optical devices" and "adaptive optics", such as adaptive mirrors. Active optical devices are known in the prior art. The adaptive optical devices are used for radiation of the visible spectral range to correct aberrations of reflecting surfaces. Fields of application for the adaptive optical device include, but are not limited to, astronomical telescopes, high-performance lasers, the human eye or lithographic systems.

The adaptive optical devices are equipped with a plurality of actuators which can, for example, modulate the shape of a reflecting surface, such as a mirror. The modulation of such a mirror is frequently carried out in real-time. The plurality of actuators are, for example, piezoelectric actuators, hydraulic actuators or pneumatic actuators and deform local portions of the mirror. In other applications, the plurality of actuators are membranes that are controlled by electrostatic fields.

The active optical devices with a deformable mirror, for example, are often used for guidance of impinging rays of light wherein the rays of light are emitted by a point source of light. The rays of light can have a long wavelength and are reflected at a surface of the deformable mirror.

Currently in the area of soft and hard X-rays transformations of a beam of X-rays are used without any corrections and it is trusted to the mechanical precision of the manufactured mirrors.

PRIOR ART

U.S. patent application No. 2005/0002087 (Knowles et al.) discloses an adaptive optical device being capable of dynamically modulating the shape of a mirror in real time to compensate for atmospheric distortions and variations along the mirror. The optical device comprises an optical layer being a mirror supported by a substrate layer. The substrate layer consists of flexible material. The substrate layer is connected to a reactive force element via an array of actuators and isolated electronic circuit layers. The motion of each one of the actuators is controlled separately by a power distribution network. The power distribution network comprises a matrix architecture of high-speed micro controllers and digital signal processors.

U.S. patent application No. 2003/0147162 (Bennett et al.) provides an adaptive optical mirror for astronomical applications. The optical mirror has a faceplate consisting of composite material such as graphite-filled cyanate ester and is supported by a backplate. A plurality of actuators is connected to the backplate of the optical mirror and a master control via a low impedance circuit to be controllable independently.

International patent application No. WO 2006/032878 (Benson) describes an adaptive optics apparatus and a method for controlling the wave front of a beam of light. The apparatus comprises a locally deformable, circular mirror for reflecting the beam of light with an inner zone and an outer zone. The mirror is deformed at the outer perimeter of the inner zone according to calculated peripheral wavefront relative amplitude and normal slope, thus providing corresponding boundary conditions for the inner zone of the mirror.

European patent application No. EP 1 376 192 (Hazelton et al.) discloses an adaptive optics system with discrete actuators for continuous deformation of a deformable mirror. The adaptive optics system is used in EUV-lithography applications (Extreme Ultra Violet) and comprises a plurality of deformable mirrors for use with EUV wavelengths, wherein each of the deformable mirrors has an optical design shape. Aberrations in the optical system are detected by a metrology system and processed by a control system accordingly.

Further, the optical system comprises an array of actuators to deform the deformable mirrors within an allowable deformation limit of the optical design shape of each mirror.

SUMMARY OF THE INVENTION

According to the present invention, there is provided a device for the reflection of impinging radiation. The device comprises at least one actuator. The device further comprises at least one partially reflective volume, wherein the at least one partially reflective volume has a first surface. The first surface of the at least one partially reflective volume is oriented towards the impinging radiation. The at least one partially reflective volume is at least partially deformable by the at least one actuator such that the radiation is reflected at and within the at least one partially reflective volume substantially in accordance with Bragg's law.

It should be noted that the term "actuator" in this context is intended to mean any device which is capable of deforming the at least one partially reflective volume or a portion of the at least one partially reflective volume.

In accordance with the invention, a large part of the impinging radiation does not penetrate the device or the at least one partially reflective volume of the device. Further, portions of the impinging radiation will not be diffracted, i.e. the physical phenomena of diffraction is of marginal importance. In accordance with Bragg's law nearly every section of the device can be used for the reflection of impinging radiation. This results in constructive interference of the impinging radiation if Bragg's law is fulfilled, i.e. in reinforcing of the amplitude of the impinging radiation. In one example, the device of the invention comprising the at least one partially reflective volume can be used in conjunction with a source of X-rays wherein the diameter of the source of the X-rays is optimized to receive an optimum focus of X-rays after the reflection at and within the at least one partially reflective volume of the device. In addition to compensating tolerances of manufacture of the device, temperature-dependent fluctuations of the at least one partially reflective volume in form of variations in a crystal lattice, for example, can be avoided or compensated using this invention. Moreover, inaccuracies in the manufacture and/or aberrations of the source of impinging radiation can be compensated using the invention. The curvature of the at least one partially reflective volume can be modified locally using the at least one actuator. A required curvature of the at least one partially reflective volume can be adjusted dynamically.

The impinging radiation may have a photon energy of between 100 eV and 250 keV. An advantage is that the inventive device can also be used for impinging soft X-rays or even impinging hard X-rays. Thus, impinging soft and hard X-rays can be reflected optimally to the surface of a test specimen through the reflective adaptive device.

The impinging radiation can have a photon energy between 1000 eV and 100 keV.

The first surface of the at least one partially reflective volume that is oriented to the impinging radiation can be, prior to deformation, substantially planar. The manufacture of the device or the at least one partially reflective volume with the substantially planar first surface can be done very easily. Production costs can be kept down, because of minor requirements of accuracy.

The terms "angle acceptance amplitude" or "rocking curve" represent the ability to reflect radiation or photons of the radiation and can be expressed in angle dimensions. The greater the value for the rocking curve the higher the intensity of the reflected radiation. The range of the angle acceptance amplitude depends, for example, on the type of the material from which the radiation is reflected and the temperature of the material. For example, the angle acceptance amplitude for an at least one partially reflective volume with a substantially planar surface, the at least one partially reflective volume comprising a crystalline silicon structure with a cut surface (slice plane) {3 1 1} is about 24 µrad for impinging X-rays from a source with a photon energy of 5.4 keV.

The first surface of the at least one partially reflective volume which is oriented to impinging radiation may be, prior to deformation, substantially curved in one dimension. The curvature in one dimension means the angle acceptance amplitude comprises several degrees and is not in the range of few grad because Bragg's law is fulfilled for nearly every section of the first surface. The curvature of the first surface of the at least one partially reflective volume which is oriented to impinging radiation may also provide additional focussing of beams of the radiation to a point.

The first surface of the at least one partially reflective volume can be, prior to deformation, substantially curved in two dimensions. If the radii of curvature $R_v$ and $R_h$ (vertical and horizontal) fulfil the equation $R_v/R_h=\sin^2(\theta_B)$, wherein $\theta_B$ represents the Bragg angle and the radii of curvature are not equal (i.e. $R_v \neq R_h$), then the transformation of a source of impinging radiation is possible within an adjustable ratio of transformation and the number of reflected photons of the rays is significantly increased. For example, the angle acceptance amplitude for a toroidal curved first surface or at least one partially reflective volume respectively comprising of a crystalline silicon structure with the cut surface (slice plane) {3 1 1} for impinging X-rays from a source with a photon energy of 5.4 keV is several degrees.

The at least one partially reflective volume can have substantially a monocrystalline structure. In this example, no substrate will be necessary to support the at least one partially reflective volume because monocrystalline structures are sufficiently stiff to support themselves. Locally induced deformations of the at least one partially reflective volume through an actuator may be distributed smoothly within the monocrystalline structure. Preferably, the monocrystalline structure of the at least one partially reflective volume should be oriented to the impinging radiation in accordance with the Bragg angle $\theta_B$. This orientation results in constructive interference at the different layers (planes) of the crystal. The beams of the impinging radiation are reflected on the other side of an optical axis at the Bragg angle $\theta_B$. In addition to the high reflectivity, such Bragg mirrors have monochromatic characteristics. A further advantage is that the neighbouring layers of atoms are at a small distance from each other, thus such a device can be preferably used for hard, i.e. energetic, radiation like hard X-rays. A monocrystalline structure is less susceptible to fluctuations of temperature and thus has enhanced thermal and radiation stability.

The substantially monocrystalline structure of the at least one partially reflective volume may be selected from the group consisting of silicon, silicon-dioxide (quartz), germanium, gallium arsenide or lithium fluoride and combinations thereof. An advantage is that such materials or combinations of materials are well suited for such reflection applications especially for the reflection of energetic radiation.

Further, the at least one partially reflective volume can have substantially a polycrystalline structure. The advantage is that nearly any kind of material can be used for the reflection of impinging radiation.

The substantially polycrystalline structure of the inventive device may be selected from the group consisting of highly ordered pyrolytic graphite (HOPG). However, the crystalline structure for the at least one partially reflective volume may be any material, i.e. inorganic or organic materials or combinations thereof.

The at least one partially reflective volume of the inventive device may comprise a plurality of layers. The plurality of layers can comprise at least one first layer of a first material and at least one second layer of a second material. The at least one first layer may be a substantially reflective layer. The at least one first layer and the at least one second layer may be arranged in a sandwich-like configuration. Such at least one partially reflective volume may comprise several hundreds of first layers and second layers. The first layers and the second layers can be manufactured by evaporation procedures at a layer of substrate or carrier material. Devices with such an at least one partially reflective volume having a plurality of first layers and second layers are innately highly reflective and have enhanced thermal and radiation stability. Further, the manufacture of complex devices with curvatures of surfaces or of the at least one partially reflective volume with a multilayer configuration is possible with less effort. One method of manufacturing of such an at least one partially reflective volume can be realized by evaporation in which the materials forming the first layer and the second layer are vaporized and condensate in a controlled manner at the surface of the substrate.

The material of the at least one first layer may be selected from the group consisting of a metal, a metalloid or a salt and combinations thereof. An advantage is that such materials are easy to obtain and sufficiently clean.

The material of the at least one first layer can be selected from the group consisting of silicon, silicon carbide or boric carbide and combinations thereof.

The material of the at least one second layer can be selected from the group consisting of a non-metal and combinations thereof.

In a further embodiment of the present invention, the material of the at least one second layer may be selected from the group consisting of carbon and combinations thereof.

According to a further aspect of the present invention, each of the at least one actuators may be a piezoelectric actuator, electrostatic actuator, hydraulic actuator, pneumatic actuator, resistance actuator or thermal actuator. Such actuators have a good dynamic (response) behaviour with minor hysteresis effects, are simple to manufacture or to obtain and have a small size. Further, each of the at least one actuators can be a membrane that can be modified in its shape or deformation by electrostatic fields. Alternatively, at least a partial deformation of the at least one partially reflective volume of the inventive device may be realized with a fluid-filled capillary.

A deformation path of each of the actuators may be individually adjustable. Every one of the actuators is separately controllable. This results in a vast amount of possible configurations of the adaptive optical device. With each of the actuators being independently controllable the shape of the at least one partially reflective volume or the surface that is oriented towards the impinging radiation can be adjusted to nearly any requirement. The impinging X-rays can be focussed to an optimally reflected beam by adjusting the at least one partially reflective volume via the plurality of actuators and the resultant deformations on the at least one partially reflective volume. Independent controllability of the actuators enables, for example, realisation of a minimum focus of X-rays, generation of parallel beams or rays, or realisation of a transformation wherein an aberration of the source of rays—if one is present—has been corrected. A further advantage is that tolerances of manufacture can be compensated accordingly by the plurality of individual controllable actuators. In addition, the radiation can be guided accordingly where the wavelength of the radiation is shorter than 10 nm, even shorter than 0.05 nm. For example, optimally reflected X-rays, generated by the device of the invention with the actuators, is a requirement to achieve high-resolution X-ray microscopy, X-ray photoelectron microscopy, X-ray crystallography, spectromicroscopy, etc.

Each of the at least one actuators may be connected to a base plate. Each of the at least one actuators may apply forces or deformations to the at least one partially reflective volume. The base plate can serve as a bearing or support for the plurality of actuators that are connected to the at least one partially reflective volume.

Further, the invention comprises a method for controlling the shape of a device for the reflection of radiation with at least one actuator and at least one partially reflective volume. The at least one partially reflective volume being at least partially deformable by said at least one actuator. A deformation path of each of the at least one actuators is individually adjustable. The method comprises:

a) Defining at least one target signal;
b) Defining at least one tolerance signal;
c) Defining at least one individual signal;
d) Transforming at least one of the at least one individual signals into at least one control signal for individually adjusting the deformation path of each of the at least one actuators to obtain at least one first shape of the device;
e) Comparing at least one of the at least one individual signals with at least one of the at least one target signals to determine whether at least one of the at least one individual signals falls within at least one of the at least one tolerance signals;
f) Amending at least one of the at least one individual signals if none of the at least one individual signals falls within at least one of the at least one tolerance signals and repeating d) and e) until at least one of the at least one individual signals falls within at least one of the at least one tolerance signals.

The method allows the creation of a desired shape of the device for the reflection of radiation can be controlled and adjusted optimally, very effectively and in a relative simple manner. At least one target signal such as the diameter of a focus of reflected X-rays, wherein the X-rays are generated by a source or the number of reflected photons of the reflected radiation, i.e. the intensity of the radiation may be specified by the user. Target information associated with the at least one target signal may comprise at least one target value. At least one of the tolerance signals may be zero or comprise at least one of an adequate, i.e. realistic value. Tolerance information associated with the at least one tolerance signal can comprise at least one tolerance value. The tolerance signal may represent an assessment criterion, i.e. an acceptable and valid deviation interval from the target signal. The at least one individual signal may contain information for controlling at least one actuator. Individual information associated with the at least one individual signal may comprise at least one individual value. An example for an individual value may be the voltage for an electric or piezoelectric-based actuator. Transforming at least one of the at least one individual signals into at least one control signal for individually adjusting the deformation path of each of the at least one actuators to obtain at least one first shape of the device may be directly, i.e. at a ratio of 1:1 or the at least one individual signals may be transformed according to a rule. The control information associated with the at least one control signal may comprise at least one control value. An example for a control value may be the voltage for an electric or piezoelectric-based actuator. Alternatively, the controlling of each of the at least one actuators is done according to a predefined rule or a self-learning procedure.

The controllable and adjustable degrees of deformation of the adaptive mirror device increase with the number of actuators and the dynamical behaviour of every actuator. A further advantage of the method according to the invention is that the method may be executed iteratively until an optimal configuration, i.e. shape of the device for the reflection of radiation is reached.

Amending at least one of the at least one individual signals may further comprise the combining at least two of the at least one individual signals. The generation of individual signals with new information can be realized in a very effective and simple manner by simply combining the information on the basis of present individual signals. The selection of corresponding individual signals and their number within combining can be done random or according to a specified rule.

Amending at least one of the at least one individual signals may further comprise amending at least one of the at least one individual signals in accordance to a rule to allow the generation of new individual signals very simply and quickly. The selection of corresponding individual signals and their number within amending in accordance to a rule can be done random or according to a specified rule.

Amending at least one of the at least one individual signals may further comprise cloning at least one of the at least one individual signals. The selection of corresponding individual signals and their number within cloning can be done random or according to a specified rule.

Comparing at least one of the at least one individual signals with at least one of the at least one target signals may further comprise selecting at least one of the at least one individual signals that falls within at least one of the at least one tolerance signals.

The method of the present invention may be a computer implemented process to allow the method to be executed with high performance. Further, the optimization procedure for controlling and adjusting the shape of the adaptive device can be controlled easily by means of an electronic data processing apparatus.

Further, the present invention provides an apparatus for controlling the shape of a device for the reflection of radiation with at least one actuator and at least one partially reflective volume. The at least one partially reflective volume being at least partially deformable by said at least one actuator, wherein a deformation path of each of the at least one actuators is individually adjustable. The apparatus comprising at least one device for the reflection of radiation with at least one actuator and at least one partially reflective volume according to any one of the preceding device claims; at least one display device; at least one input device; at least one processing device; at least one transformation device; at least one control device; The at least one display device may be for example a monitor or computer screen or any other type of display device. The at least one input device can be a console or keyboard respectively or a computer mouse or any other type of input device. The at least one processing device may comprise a main board, data and network interfaces, a central processing unit, memory means such as ROM/RAM, communication ports, disk controllers, CD-ROM/DVD/floppy-drives, hard drives, bus systems, etc. The at least one transformation device may be an adapter in hardware. Alternatively the at least one transformation device may be implemented as software. Further, the apparatus for controlling the shape of a device may comprise at least one control device such as sensors and controllers.

The present invention also provides a computer-readable medium comprising instructions which, when executed by a processor, causes an electronic data processing system to perform the disclosed inventive method for controlling the shape of a device for the reflection of radiation with at least one actuator and at least one partially reflective volume, wherein the at least one partially reflective volume being at least partially deformable by said at least one actuator and a deformation path of each of the at least one actuators is individually adjustable. The computer-readable medium can be a floppy disk, CD-ROM, DVD, hard disk, USB memory stick, etc.

Alternatively, the instructions for executing the method for controlling the shape of a device for the reflection of impinging radiation according to the present invention can be received via a communications network such as a download from the internet.

Further, the present invention discloses a computer program product, being loadable into at least one memory of a mobile computer readable medium or into an electronic data processing apparatus. The computer program product comprising program code means to perform the disclosed method for controlling the shape of a device for the reflection of radiation with at least one actuator and at least one partially reflective volume, wherein the at least one partially reflective volume being at least partially deformable by said at least one actuator and a deformation path of each of the at least one actuators is individually adjustable if the program is executed on the mobile computer readable medium or on the electronic data processing apparatus.

These together with other advantages and objects that will be subsequently apparent, reside in the details of construction and operation as more fully herein described and claimed, with reference being had to the accompanying figures.

DETAILED DESCRIPTION

Figure 1:
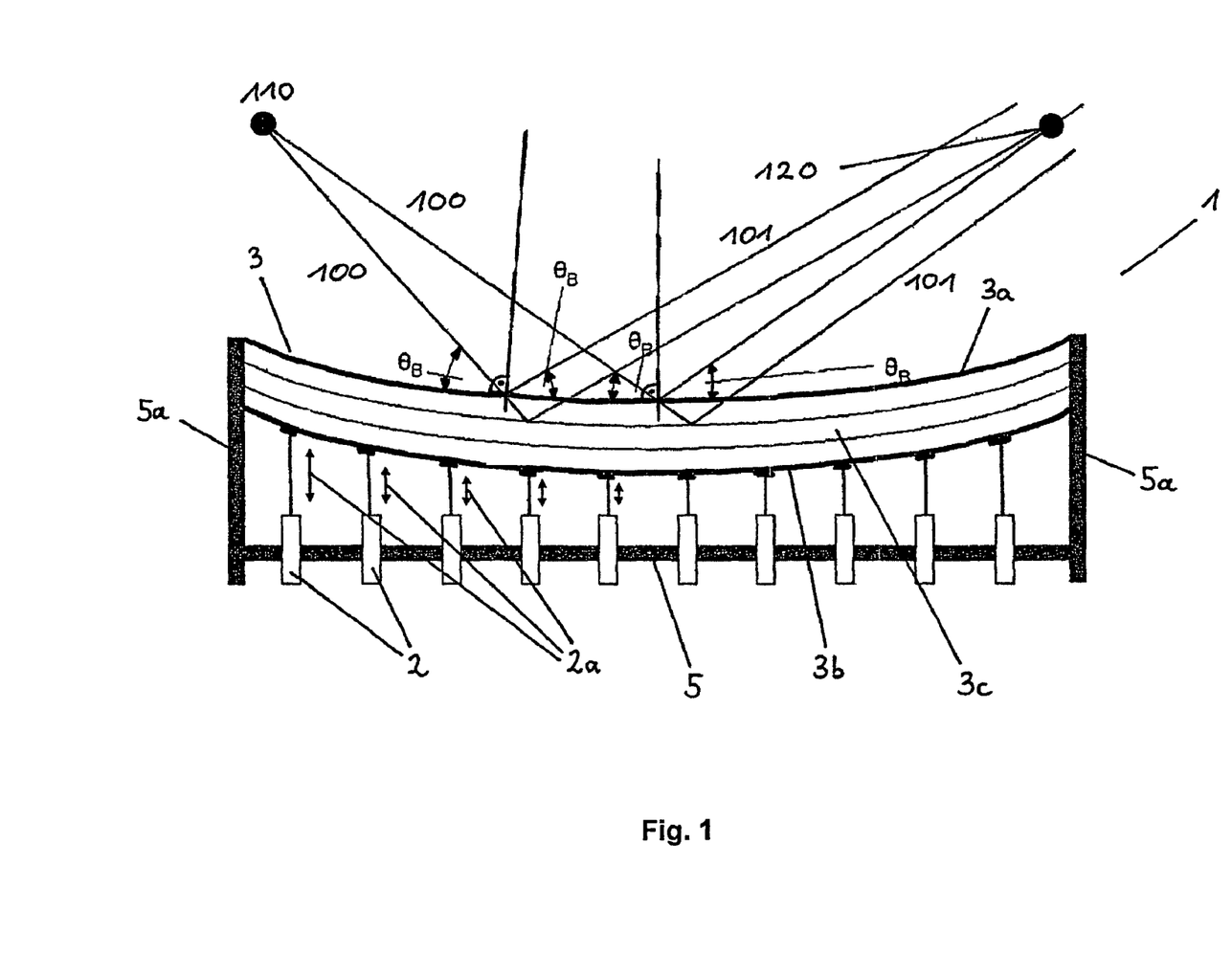
FIG. 1 is a schematic two-dimensional view of an example of the adaptive optical device according to the present invention.

FIG. 1 shows a schematic two-dimensional view of an example of the inventive adaptive optical device 1. Impinging radiation 100 is reflected by means of a partially reflective volume 3 in accordance with Bragg's law. In other words, constructive interference of the reflected radiation 101 can be obtained because the angle of incidence of the impinging radiation 100 as well as the angle of reflexion of the reflected radiation 101 corresponds to the Bragg angle $\theta_B$. Further, the reflected radiation 101 establishes a desired focal point 120 at a desired position.

The partially reflective volume 3 comprises a first surface 3a. The first surface 3a of the partially reflective volume 3 is oriented to the impinging radiation 100. In the present example of the adaptive optical device 1 in FIG. 1, the first surface 3a and the partially reflective volume 3 have, prior to deformation, substantially a toroidal shape, i.e. they are curved in two dimensions. The impinging radiation 100 can be generated by a source of rays 110. The impinging radiation 100 can be monochromatic soft and/or hard X-rays but is not limited to these wavelengths.

The partially reflective volume 3, shown in FIG. 1, can comprise a substantially monocrystalline structure 3c. The atoms, ions or molecules of a monocrystalline structure 3c build up a uniformly, homogeneous crystal lattice. The crystal lattice of the partially reflective volume 3 can be a cubical crystal system, a tetragonal (dimetrical) crystal system, a tetragonal crystal system, a rhombical crystal system, a hexagonal crystal system, a monoclinic crystal system, a triclinic crystal system or any other type of crystal systems. The monocrystalline structure 3c of the partially reflective volume 3 can be selected from the group consisting of silicon, silicon-dioxide (quartz), germanium, gallium arsenide or lithium fluoride and combinations thereof.

Alternatively, the partially reflective volume 3 can have substantially a polycrystalline structure 3c. A polycrystalline structure 3c is a crystalline solid body-comprising a plurality of single, i.e. mono crystals. The polycrystalline structure (3c) may be selected from the group consisting of highly ordered pyrolytic graphite (HOPG).

The partially reflective volume 3 and/or the first surface 3a is at least partially deformable by at least one actuator 2, i.e. at least one actuator 2 is connected with the partially reflective volume 3. In FIG. 1, ten ones of the actuators 2 are displayed. The actuators 2 can be arranged in a matrix architecture, i.e. the actuators 2 compose arrays in two dimensions. Each of the actuators 2 may be a piezoelectric actuator, such as a stack actuator. Alternatively, each of the actuators 2 can be a hydraulic actuator, such as a hydraulic cylinder. However, according to the invention, any other kinds of actuators 2 can be used to generate deformations at at least portions of the partially reflective volume 3.

Each of the actuators 2 can be independently controlled, i.e. the deformation paths 2a that are generated by each of the actuators 2 can be adjusted individually. Hence, any shape of the adaptive optical device 1, in particular the partially reflective volume 3 with its first surface 3a can be realized.

Each of the actuators 2 is connected to a common base plate 5. The connection between each of the actuators 2 and the base plate 5 can be realized with an adhesive connection or any other kind of connection means known from prior art. The base plate 5 serves as a bearing to support each of the actuators 2. In the example of FIG. 1, the partially reflective volume 3 is supported at its side walls by holding walls 5a. The holding walls 5a are part of the base plate 5 in the shown example of an adaptive optical device 1.

Control and adjustment of each of the actuators 2 leads to a desired deformation of the shape of the partially reflective volume 3 and the first surface 3a. Almost any shape of the partially reflective volume 3 can be realized via the deformations of the actuators 2 which are induced at a second surface 3b by the actuators 2. The deformation of an actuator 2 is represented by a deformation path 2a.

With such an adaptive optical device 1 X-rays do not penetrate the partially reflective volume 3. The X-rays, i.e. the impinging radiation 100, may have a longer wavelength. The impinging radiation 100 is reflected at and within the partially reflective volume 3 such that Bragg's law is substantially fulfilled.

Figure 2:
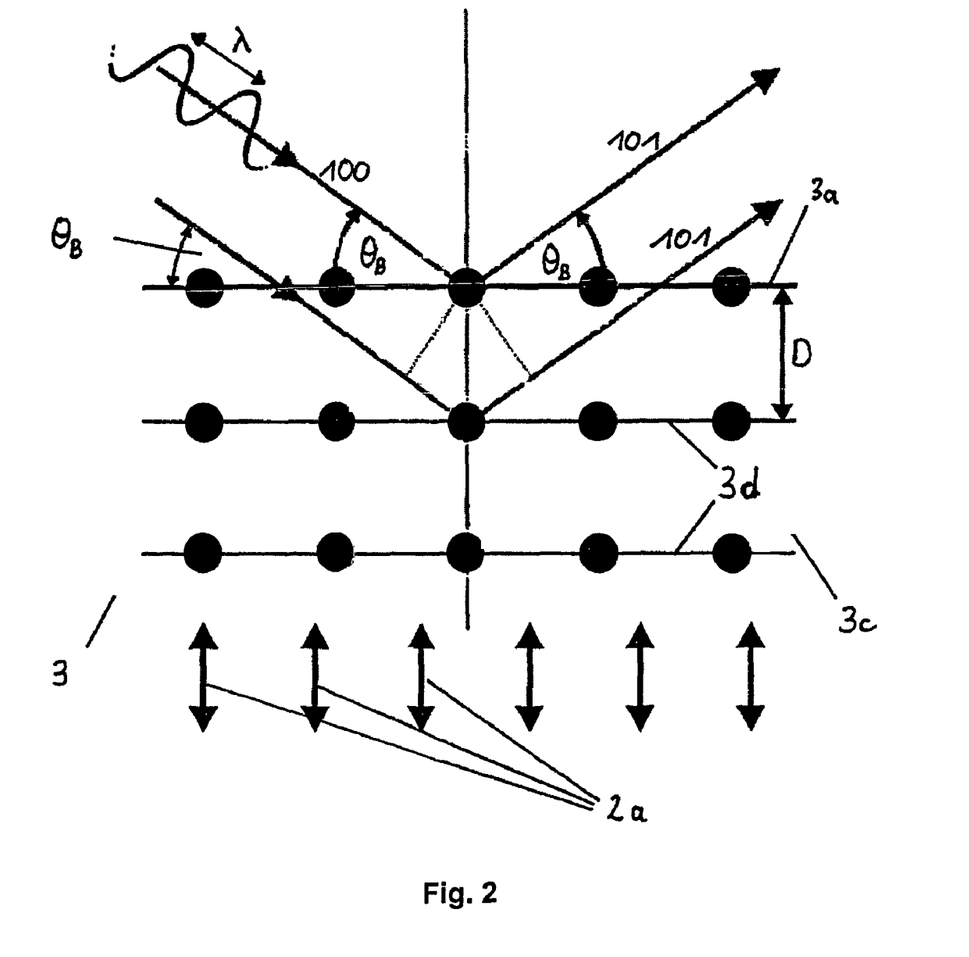
FIG. 2 shows a sectional view of an example of the partially reflective volume.

FIG. 2 shows a sectional view of an example of the partially reflective volume 3 of the inventive adaptive optical device 1 at an atomic level in a schematic manner. Atoms of the material of the crystalline structure 3c of the partially reflective volume 3 are represented by spheres and are organized in atomic layers 3d. The partially reflective volume 3 comprises a plurality of atomic layers 3d that lie on top of each other. The distance between two atomic layers 3d is represented by a distance D. The crystalline structure 3c of the partially reflective volume 3 in FIG. 2 is substantially a cubic-primitive lattice. Any other crystal lattices for the crystalline structure 3c are conceivable.

The partially reflective volume 3 comprises a first surface 3a that is oriented to impinging radiation 100. The partially reflective volume 3 comprising the first surface 3a has been deformed by a plurality of actuators 2 (see FIG. 1 or 3), i.e. deformations paths 2a of the actuators 2 (see FIG. 1 or 3) accordingly in order to receive a desired shape of the partially reflective volume 3 and the first surface 3a such that the impinging radiation 100 is reflected according to Bragg's law.

To receive constructive interference for the reflected radiation 101 a periodic sequence of atomic layers 3d is necessary. Each of the atomic layers 3d represents a section of high refraction index. The space between the atomic layers 3d represents a section of low refraction index. A portion of the impinging radiation 100 is reflected at the atomic layers and superimposes itself. The distance D between two atomic layers 3d of the partially reflective volume 3 and the wavelength $\lambda$ of the impinging radiation 100 determines the angle of incidence. According to the shape of the partially reflective volume 3 and the first surface 3a in FIG. 2, the angle of incidence as well as the angle of reflexion is the Bragg's angle $\theta_B$. According to Bragg's law, $n \cdot \lambda = 2 \cdot D \cdot \sin(\theta_B)$ constructive interference of the reflected radiation 101 can be reached if the retardation $n \cdot \lambda$ is an integer multiple of the wavelength $\lambda$ of the impinging radiation 100.

Figure 3:
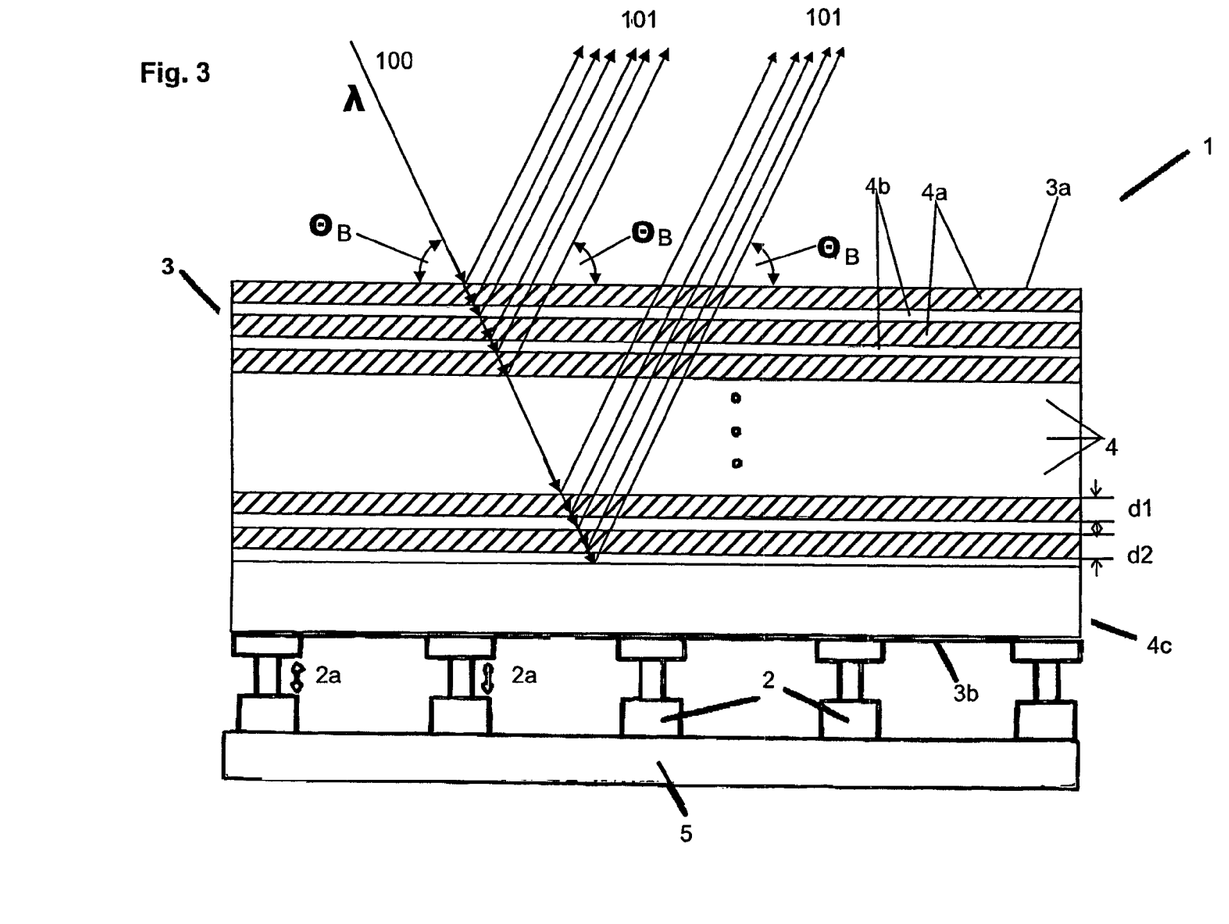
FIG. 3 shows a further example of the inventive adaptive optical device 1 in a schematic manner.

FIG. 3 shows a further example of the inventive adaptive optical device 1 in a schematic manner. The partially reflective volume 3 of the inventive adaptive optical device 1 of FIG. 3 comprises a plurality of layers 4. In particular, the partially reflective volume 3 comprises a substrate layer 4c. The substrate layer 4c serves as a support for the plurality of layers 4a, 4b. The plurality of layers 4a, 4b can be manufactured by a vaporization procedure according to which any layer 4a, 4b is vaporized successively on the substrate layer 4c.

As shown in FIG. 3, one side 3b of the substrate layer 4c of the partially reflective volume 3 is connected to a plurality of actuators 2. The actuators 2 can be, for example, piezoelectric actuators, hydraulic actuators, membrane actuators or any other kind of actuators.

The partially reflective volume 3 comprises a first surface 3a that is oriented to the impinging radiation 100. The partially reflective volume 3 is at least partially deformable by the plurality of actuators 2 or their deformation paths 2a, i.e. each of the actuators 2 can apply its deformation on the partially reflective volume 3. The actuators 2 are connected to a base plate 5. The base plate 5 serves as a support. Each deformation path 2a of each actuator 2 can be controlled individually to realize a desired shape of the partially reflective volume 3 in order to realize that the impinging radiation 100 is reflected according to Bragg's law.

The first layers 4a of the partially reflective volume 3 are substantially reflective layers and can be made of a metal, a metalloid or a salt such as silicon, boric carbide or combinations thereof. The second layers 4b of the partially reflective volume 3 can be made of a non-metal such as selected from the group consisting of carbon or combinations thereof. Alternatively, the second layers 4b can consist of materials of the group consisting of metalloids such as silicon. If so, the material for the first layers 4a can be molybdenum for example.

Thus, the first layers 4a represent layers with a high refraction index and the second layers 4b represent layers with a low refraction index. The thickness d1 of each of the first layers 4a is in the range of 1 nm to 5 nm. The thickness d2 of each of the second layers 4b is in the range of 1 nm to 3 nm. Thus, the partially reflective volume 3 of the inventive adaptive optical device 1 can comprise several hundreds of layers 4. The adaptive optical device 1 in FIG. 3 can be used for soft X-rays.

Figure 4:
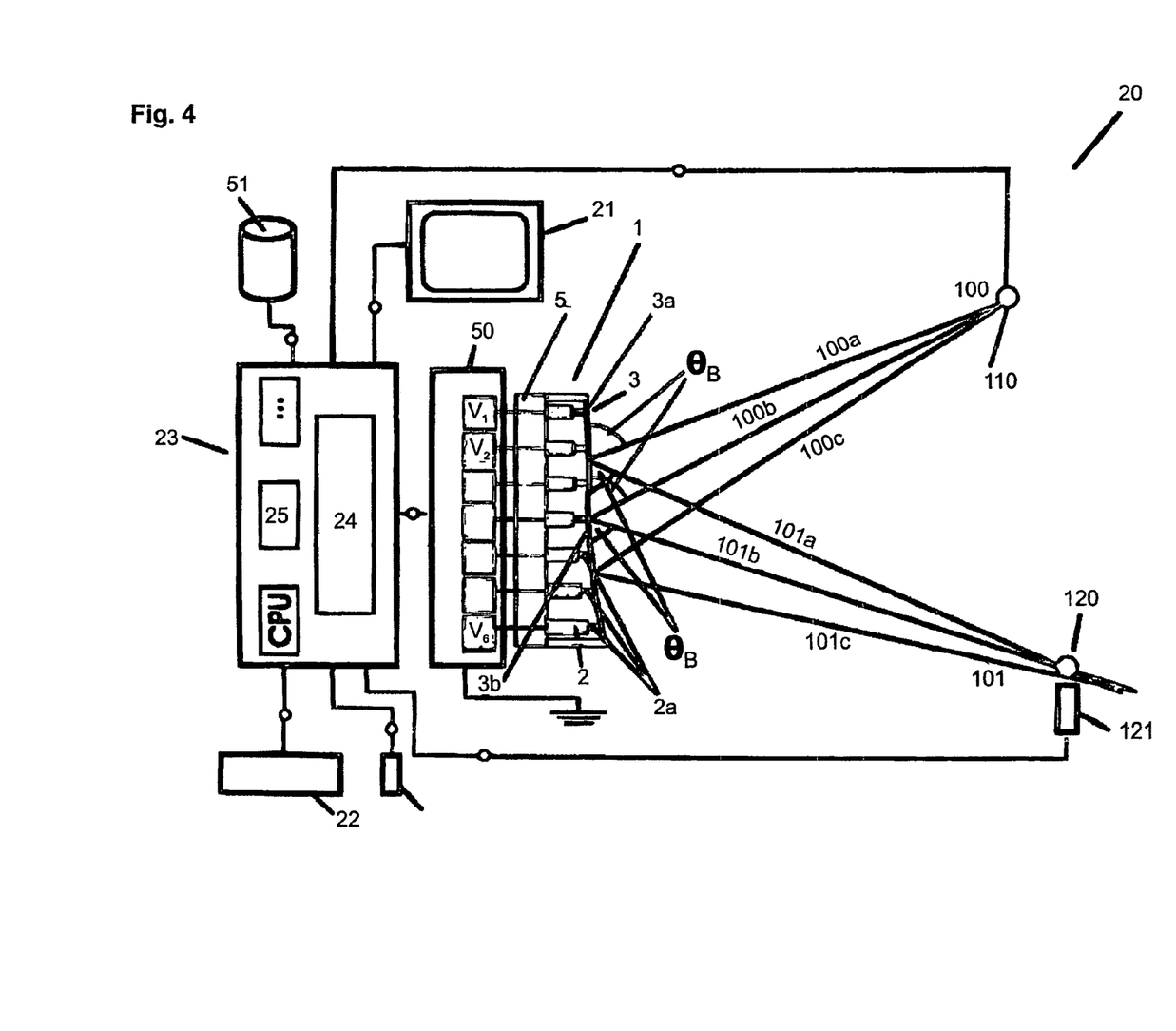
FIG. 4 is a schematic overview of an apparatus for controlling the shape of the adaptive optical device.

FIG. 4 is a schematic overview of an apparatus 20 for controlling the shape of the adaptive optical device 1 or the partially reflective volume 3 of the adaptive optical device 1, respectively. The apparatus 20 comprises one adaptive optical device 1 for the reflection of impinging radiation 100 according to Bragg's law.

The example of an adaptive optical device 1 of FIG. 4 comprises a base plate 5 and a plurality of actuators 2, e.g. piezoelectric actuators 2. A first end of each of the piezoelectric actuators 2 is connected to the base plate 5. The base plate 5 serves as a support or fixation of the actuators 2 and the partially reflective volume 3. A second end of each of the actuators 2 is connected to the second surface 3b of the partially reflective volume 3.

The partially reflective volume 3 comprises a first surface 3a that is oriented to the impinging radiation 100. The impinging radiation 100 in FIG. 4 is represented by three radiation lines 100a, 100b, 100c. The impinging radiation 100a, 100b, 100c may be, for example, soft or hard X-rays and generated by a radiation source 110. Each deformation path 2a of the actuators 2 can be controlled or adjusted individually, i.e. independently. Each of the actuators 2 is connected with a power supply unit 50.

As shown in FIG. 4, the shape of the partially reflective volume 3 has been deformed by the individually controlled actuators 2 such that the impinging radiation lines 100a and 100b are reflected according to Bragg's law, i.e. the angle of incidence is equal to the angle of reflexion being the Bragg angle $\theta_B$. For the impinging radiation line 100c the shape of the partially reflective volume 3 can be modified accordingly such that reflection corresponds to Bragg's law. Prior to deformation by the actuators 2 the first surface 3a of the partially reflective volume 3 was substantially planar. The shape of the partially reflective volume 3 is modified such that a desired focus 120 of the reflected radiation 101 can be realized.

The apparatus 20 of FIG. 4 further comprises a processing device 23. The processing device 23 can be a data processing device such as personal computer comprising main components (not shown in FIG. 4) such as a main board, data and network interfaces, a central processing unit, memory means such as ROM/RAM, communication ports, control interfaces, disk controllers, CD-ROM/DVD/floppy-drives, hard drives, bus systems, etc. The processing device 23 can be connected to an external database 51 via a network or the Internet or any other type of communication network. The processing device 23 can be connected to several data input devices 22 such as a computer keyboard and/or a computer mouse. Further, the processing device 23 is connected to a display device 21. The display device 21 may be a LCD-monitor or a display screen or any other type of display devices 21.

In FIG. 4, the apparatus 20 for controlling the shape of an adaptive optical device 1 for the reflection of impinging radiation 100 according to Bragg's law comprises a sensor device 121 for sensing the reflected radiation 101. The sensor device 121 is connected to the processing device 23 and transmits signals (shown as black dots on the figure) about the characteristic of the reflecting radiation 101 to the processing device 23. Further, the processing device 23 is connected with the radiation source 110.

The processing device 23 can be an electronic data processing system and execute a method for controlling the shape of the inventive adaptive optical device 1. Relevant signals for controlling and information processing may be processed by a transformation device 24 in connection with a control device 25. The transformation device 25 and/or the control device 25 and/or components of the processing device 23 may be in hardware and/or software.

The apparatus 20 of FIG. 4 represents a closed loop with respect to the controlling the shape of the adaptive optical device 1 for the reflection of impinging radiation 100.

Figure 5:
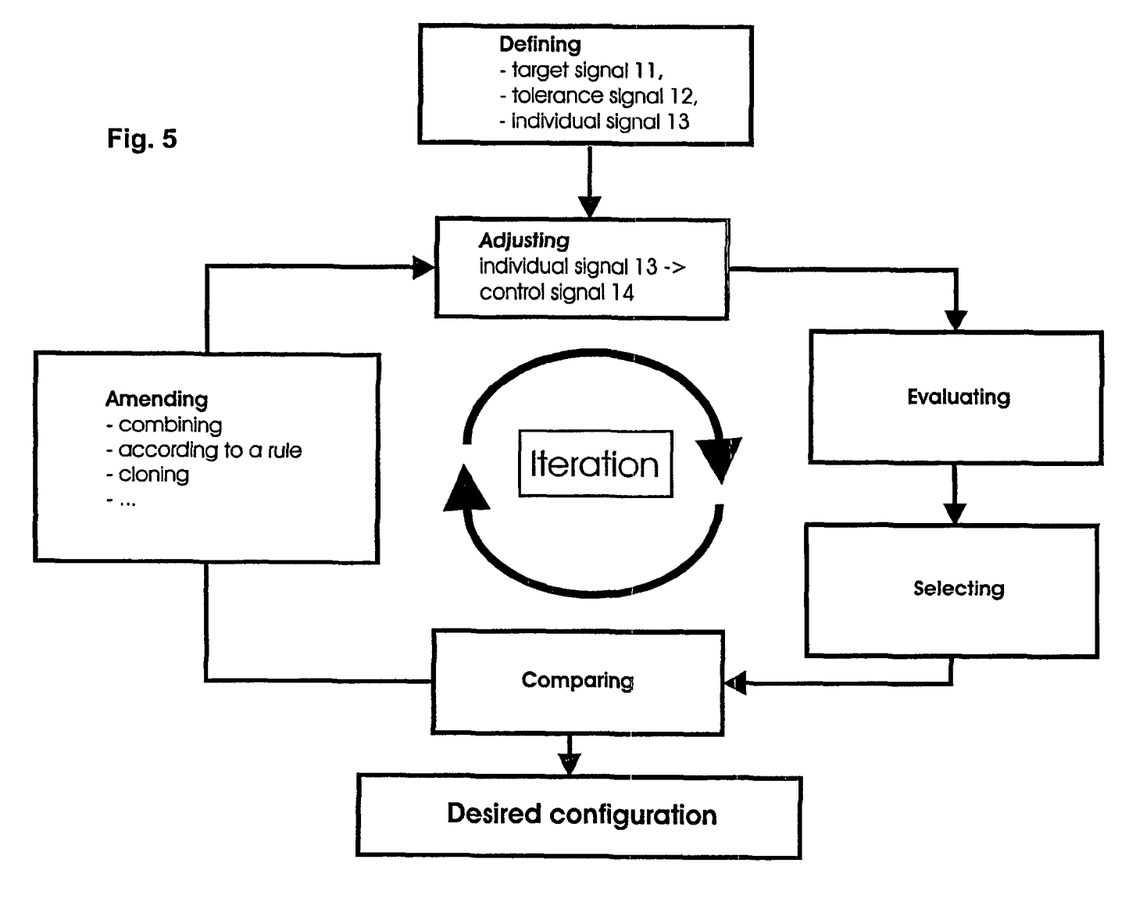
FIG. 5 is a schematic overview of an example of the inventive method for controlling the shape of an adaptive optical device.

FIG. 5 is a schematic overview of an example of the inventive method for controlling the shape of an adaptive optical device 1 (cf. FIG. 1, 3 or 4) for the reflection of impinging radiation 100 substantially in accordance with Bragg's law.

The procedure termed "Defining" can comprise the definition of at least one target signal 11, at least one tolerance signal 12 and at least one individual signal 13. The at least one target signal 11 may comprise at least one target value. The at least one tolerance signal 12 can comprise at least one tolerance value. The at least one individual signal 13 may comprise at least one individual value.

The at least one target signal 11 represents, for example, a desired diameter of the focus 120 of the reflected radiation 101, the number of photons of the reflected radiation 101 of the adaptive optical device 1, etc. The at least one target signal 11 can be defined manually by a user or automatically as a result of a procedure.

The at least one tolerance signal 12 represents at least one assessment criterion and can have zero value or any other values not equal to zero. The at least one tolerance signal 12 can be defined manually by a user or automatically as a result of a procedure.

The at least one tolerance signal 12 defines an allowable deviation for at least one current shape configuration signal from the target signal 12, i.e. the tolerance signal 12 defines a valid range for a deviance of the at least one current shape configuration signal. The at least one current shape configuration signal represents at least one individual signal 13. The at least one shape configuration signal can represent at least one shape configuration of the at least one partially reflective volume 3. The at least one current shape configuration signal is a sum of the plurality of individual signals 13. The at least one current shape configuration signal can result from a measuring of the reflected radiation 101 by a sensor device 121. The at least one current shape configuration signal can be retrieved from a stored information and can include at least one information from at least one individual signal 13.

The at least one individual signal 13 can have information for adjusting at least one actuator 2, i.e. information for adjusting the length of at least one deformation path 2a of the at least one actuator 2. The at least one individual signal 13 can be a stored signal and/or a measured signal and/or be generated according to a rule. The definition of each of the individual signals 13 can be realized by hardware components and/or by software.

The procedure termed "Adjusting" can comprise transformation of at least one of the at least one individual signals 13 into at least one control signal 14. The transformation of the at least one individual signal 13 into an at least one control signal 14 can be at a ratio of 1:1 or according to another rule. The transformation can be realized by hardware components and/or by software. Alternatively, the transformation of the at least one individual signal 13 into the at least one control signal 14 can be omitted and the at least one individual signal 13 can be used to adjust at least one actuator 2, i.e. the at least one deformation path 2a of the at least one actuator 3. Each of the at least one actuator 2 can have its own individual signal 13 and/or control signal 14.

Further, there can be a plurality of adjustments of the plurality of actuators 2 to receive at least one first shape or a plurality of shape configuration of the at least one partially reflective volume 3 or the adaptive optical device 1, respectively. Each of the at least one shape configuration of the at least one partially reflective volume 3 can be stored by, for example, corresponding ones of the individual signals 13. Several shape configurations can be adjusted. Each shape configuration, i.e. each control signal 13 for each actuator 2 can be stored.

The procedure termed "Evaluating" comprises the evaluation of at least one shape configuration of the at least one partially reflective volume 3 of the adaptive optical device 1. The evaluation can be performed with respect to a desired characteristic of the reflected radiation 101. Each of the at least one shape configuration represents a specific or corresponding characteristic of the reflected radiation 101. The desired characteristic of the reflected radiation 101, e.g., reflexion of X-rays substantially according to Bragg's law and generating a focus of the reflected X-rays of a specified diameter, can be represented by at least one target signal 11. The reflected radiation 101 can be measured by a sensor device 121.

A current characteristic of the reflected radiation 101 can be represented by a current shape configuration signal and corresponds to a current adjustment of the plurality of actuators 2, by individual signals 13 and/or control signals 14. Each shape of the partially reflective volume 3 corresponds to a specific setting or adjusting of the actuators 2. The evaluation can be done according to a rule. The results of the evaluation can be displayed on a display device 21.

The procedure termed "Selecting" comprises selection of the at least one individual signal 13 or the at least one shape configuration. The selection can be performed according to a rule and can include the choice of at least one shape configuration that seems to be appropriate to produce a desired reflected radiation 101.

The procedure termed "Comparing" comprises comparison of at least one of the at least one individual signals 13 or the plurality of individual signals 13, representing a specific shape configuration and being represented by a current one of the shape signals, with at least one of the at least one target signals 11 to determine whether at least one of the at least one individual signals 13 or the current one of the shape signals falls within at least one of the at least one tolerance signal 12. As already mentioned before, a plurality of the individual signals 13 can represent a specific adjustment of the actuators 2, i.e. a specific shape configuration of the partially reflective volume 3 corresponds to a specific characteristic of the reflected radiation 101. If at least one of the at least one individual signals 13 or the plurality of individual signals 13, representing a specific shape configuration and being represented by a current shape signal comes close to the target signal 11 and falls within at least one tolerance signal 12, then the method can be stopped and a desired shape configuration of the partially reflective volume 3 is reached.

If none of the at least one individual signals 13 or if none of a plurality of individual signals 13, representing a specific shape configuration and being represented by a current shape signal falls within at least one of the at least one tolerance signal 12 then the method continues with the procedure termed "Amending".

In the "Amending" procedure, at least one of the individual signals 13 is amended. The amendment of the individual signals 13 can be performed by combining at least two of the at least one individual signals 13, i.e. combining of information of at least two of the at least one individual signals 13. The selection of the individual signals 13 for combining can be performed randomly and/or according to a rule. The combining can be performed randomly and/or according to a rule.

The amendment of the individual signals 13 can be performed by amending at least one of the at least one individual signal 13 in accordance to a rule and/or by cloning of at least one of the at least one individual signals 13. The selection of the individual signals 13 for amending in accordance to a rule and/or cloning can be performed randomly and/or according to a rule. The amendment according to a rule and/or cloning can be performed randomly and/or according to a rule.

It is self-evident that such amendments of the individual signal 13 can be done solely or in combination. Alternatively, the amendment of at least one individual signal 13 can be done via a random process. Each ones of the individual signals 13 for each actuator 2 can be amended. For example, an individual signal 13 may contain one specific individual value for a specific actuator 2. The individual value may, for example, represent a voltage value if the actuator 2 is a piezoelectric actuator or an electrostatic actuator.

After amending a plurality of the individual signals 13, for example, the amended ones of the individual signals 13 serve as new ones of the individual signals 13 for adjusting the actuators 2 to realize at least one next shape configuration of the partially reflective volume 3 and to continue the method again. Thus, the method can be performed iteratively until a desired shape configuration of the partially reflective volume 3 can be obtained to obtain a desired characteristic of reflected radiation 101.

The invention has been described in terms of single preferred examples. The man skilled in the art will recognize that the invention can be practiced with modification within the spirit and scope of the attached claims.

The invention claimed is:
1. A device for the reflection of radiation comprising:
 a) at least one actuator;
 b) at least one partially reflective volume, the at least one partially reflective volume having a first surface oriented to the radiation;
the at least one partially reflective volume being at least partially deformable by said at least one actuator such that the radiation is reflected at the at least one partially reflective volume substantially in accordance with Bragg's law, wherein the at least one partially reflective volume has a substantially monocrystalline structure selected from the group consisting of silicon-dioxide (quartz), germanium, gallium arsenide or lithium fluoride and combinations thereof.

2. The device according to claim 1, wherein the radiation has photon energy between 100 eV and 250 keV.

3. The device according to claim 1, wherein the radiation has photon energy between 1000 eV and 100 keV.

4. The device according to claim 1, wherein said first surface is prior to deformation substantially planar.

5. The device according to claim 1, wherein said first surface is prior to deformation substantially curved in one dimension.

6. The device according to claim 1, wherein said first surface is prior to deformation substantially curved in two dimensions.

7. A device for the reflection of radiation comprising:
 a) at least one actuator;
 b) at least one partially reflective volume, the at least one partially reflective volume having a first surface oriented to the radiation;
the at least one partially reflective volume being at least partially deformable by said at least one actuator such that the radiation is reflected at the at least one partially reflective volume substantially in accordance with Bragg's law, wherein the at least one partially reflective volume has substantially a polycrystalline structure.

8. The device according to claim 7, wherein the polycrystalline structure is selected from the group consisting of highly ordered pyrolytic graphite.

9. The device according to claim 1, wherein each of the at least one actuators is one of a piezoelectric actuator, an electrostatic actuator, a hydraulic actuator, a pneumatic actuator, a resistance actuator or a thermal actuator.

10. The device according to claim 1, wherein a deformation path of each of the at least one actuators is individually adjustable.

11. The device according to claim 1, wherein the at least one actuator is connected to a base plate.

12. A method for controlling the shape of a device for the reflection of radiation with at least one actuator and at least one partially reflective volume, the at least one partially reflective volume being at least partially deformable by said at least one actuator, wherein a deformation path of each of the at least one actuators is individually adjustable, the method comprising:
 a) Defining at least one target signal;
 b) Defining at least one tolerance signal;
 c) Defining at least one individual signal;
 d) Transforming at least one of the at least one individual signals into at least one control signal for individually adjusting the deformation path of each of the at least one actuators to obtain at least one first shape of the device;
 e) Comparing at least one of the at least one individual signals with at least one of the at least one target signals to determine whether at least one of the at least one individual signals falls within at least one of the at least one tolerance signals;
 f) Amending at least one of the at least one individual signals if none of the at least one individual signals falls within at least one of the at least one tolerance signals and repeating d) and e) until at least one of the at least one individual signals falls within at least one of the at least one tolerance signals.

13. The method according to claim 12, wherein amending at least one of the at least one individual signals further comprises:
Combining at least two of the at least one individual signals.

14. The method according to claim 12, wherein amending at least one of the at least one individual signals further comprises:
Amending at least one of the at least one individual signals in accordance to a rule.

15. The method according to claim 12, wherein amending at least one of the at least one individual signals further comprises:
Cloning at least one of the at least one individual signals.

16. The method according to claim 12, wherein comparing at least one of the at least one individual signals with at least one of the at least one target signals further comprises:
Selecting at least one of the at least one individual signals that falls within at least one of the at least one tolerance signals.

17. The method according to claim 12, wherein the method is a computer implemented process.

18. An apparatus for controlling the shape of a device for the reflection of radiation with at least one actuator and at least one partially reflective volume, the at least one partially reflective volume being at least partially deformable by said at least one actuator, wherein a deformation path of each of the at least one actuators is individually adjustable, the apparatus comprising:
a) at least one device for the reflection of radiation comprising:
i. at least one actuator;
ii. at least one partially reflective volume, the at least one partially reflective volume having a first surface oriented to the radiation, the at least one partially reflective volume being at least partially deformable by said at least one actuator such that the radiation is reflected at the at least one partially reflective volume substantially in accordance with Bragg's law;
b) at least one display device;
c) at least one input device;
d) at least one processing device;
e) at least one transformation device;
f) at least one control device.

19. A computer-readable medium comprising instructions which, when executed by a processor, causes an electronic data processing system to perform a method for controlling the shape of a device for the reflection of radiation with at least one actuator and at least one partially reflective volume, the at least one partially reflective volume being at least partially deformable by said at least one actuator, wherein a deformation path of each of the at least one actuators is individually adjustable, the method comprising:
a) Defining at least one target signal;
b) Defining at least one tolerance signal;
c) Defining at least one individual signal;
d) Transforming at least one of the at least one individual signals into at least one control signal for individually adjusting the deformation path of each of the at least one actuators to obtain at least one first shape of the device;
e) Comparing at least one of the at least one individual signals with at least one of the at least one target signals to determine whether at least one of the at least one individual signals falls within at least one of the at least one tolerance signals;
f) Amending at least one of the at least one individual signals if none of the at least one individual signals falls within at least one of the at least one tolerance signals and repeating d) and e) until at least one of the at least one individual signals falls within at least one of the at least one tolerance signal.

20. The apparatus according to claim 18, wherein the processing device is connected to a sensor device.

* * * * *